Dec. 18, 1934.  D. CAMPBELL  1,985,146
HYDRAULIC POWER TRANSMITTER
Filed May 13, 1933   2 Sheets-Sheet 1

Inventor
Duncan Campbell
by Wilkinson & Mawhinney
Attorneys.

Dec. 18, 1934.  D. CAMPBELL  1,985,146
HYDRAULIC POWER TRANSMITTER
Filed May 13, 1933   2 Sheets-Sheet 2
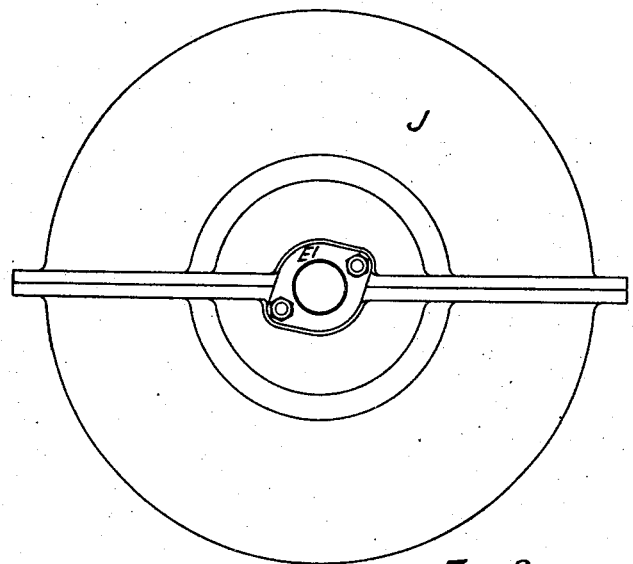
FIG: 2.
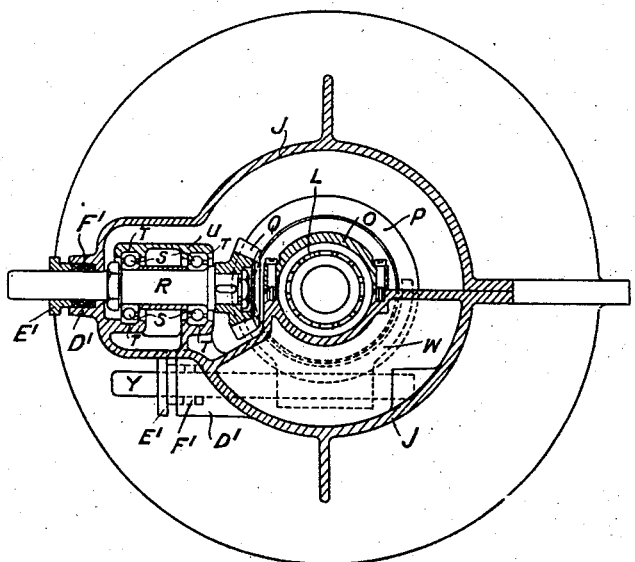
FIG: 3.
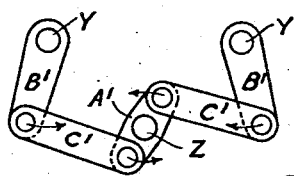
FIG: 4.
Inventor
Duncan Campbell
by Wilkinson & Mawhinney
Attorneys.

Patented Dec. 18, 1934

1,985,146

UNITED STATES PATENT OFFICE 1,985,146

HYDRAULIC POWER TRANSMITTER

Duncan Campbell, Dumbreck, Glasgow, Scotland

Application May 13, 1933, Serial No. 670,985
In Great Britain May 18, 1932

1 Claim. (Cl. 60—54)

This invention relates to improved hydraulic power transmitters (of the reversible, variable speed or torque converting type) and has for its object, inter alia to simplify the construction and driving of motor cars and other power driven vehicles by its displacement of such items of mechanical power transmission as friction clutches, variable gear-boxes, free wheels, and differential gears, which are generally incorporated in vehicles of this class. Of course, the transmitter is applicable to any machine, stationary or mobile, where the conditions of power transmission are similar to those of the aforementioned vehicles.

According to this invention, I employ two impellers mounted on a shaft, which is connected through a suitable right-angle gear drive to the driving unit; the impellers being capable of sliding longitudinally on the shaft; and two turbine runners having forward and reverse blades, each driven independently by an impeller and arranged in such a manner that, by suitably operating the impellers, they may be brought in line to oppose the forward or reverse blades of the respective turbine runners. The turbine runners are suitably connected to the driven shafts.

The control mechanism for sliding the impellers may be so arranged that the impellers always slide in opposing directions giving parallel working of the transmitter, thus the driven shafts both rotate in the same direction, i. e., both forward or both reverse. The control mechanism, however, may be arranged if desired to give independent sliding movement of the impellers and consequently any direction of rotation of the driven shafts.

The whole is or may be enclosed within a casing split into two sections and suitably connected or jointed on a plane which passes through the axis of the shafts, and where the shafts and other spindles emerge from the casing, stuffing boxes are formed and suitable glands and packings provided.

In order that my invention may be properly understood and readily carried into effect I have hereunto appended two sheets of drawings, of which:—

Figure 2 is an end view of Figure 1.

Figure 3 is a section through the vertical centre line 1—1 of Figure 1.

Figure 4 illustrates one form of control mechanism.

Figure 1:
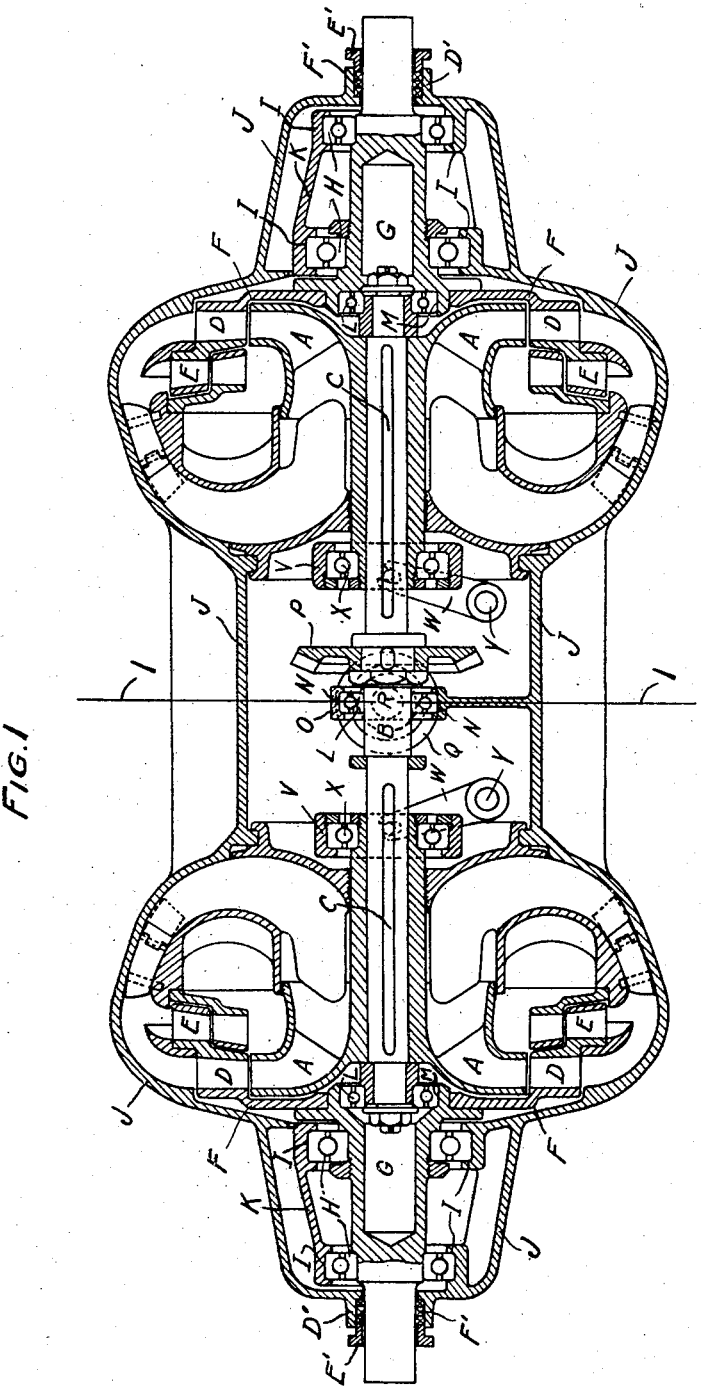
Figure 1 is a sectional elevation of the transmitter.

Referring to the drawings, the transmitter is constructed in such a manner that two impellers A are mounted on a shaft B, being keyed thereto by means of keys C, but capable of sliding longitudinally to oppose the forward blades D or the reverse blades E of the turbine runners F. The turbine runners F are mounted on the driven shafts G, being suitably connected to same, and the driven shafts G are carried on ball bearings H situated or placed in suitable recesses I formed in the lower section of the casing J and the bearing covers K. The shaft B is carried on ball bearings L situated or placed, at the ends of shaft B in suitable recesses M formed in the hubs of the driven shafts G, and at any intermediate point or points as may be required, along its length in a suitable recess or recesses N formed in the lower section of the casing J and the bearing cover or covers O. Secured to the shaft B at a point between the impellers A is a bevel-wheel, worm-wheel or other suitable gear-wheel P, which is driven by a suitable pinion or worm Q mounted on the shaft R, which in turn is connected to the shaft of the driving unit (not shown). The spindle R is carried on ball bearings S situated or placed in suitable recesses T formed in the lower section of the casing J and the bearing cover U.

Collars V, with which the impeller operating forks W engage are carried on ball bearings X at the ends of the central bosses of the impellers A. The spindles Y on which the operating forks W are fixed are housed and rotate in the casing J and the impellers A may be operated individually by such spindles Y; or the impellers may be operated in parallel through a mechanism such as shown in Figure 4 where Z is the operating spindle carrying a double crank $A^1$ which connects to the levers $B^1$ on the spindles Y through the links $C^1$. Rotation of the operating spindle Z would thus cause the impellers A to slide in opposing directions thus always ensuring parallel working of the transmitter. It is to be understood that although I have described and illustrated one form of control mechanism there are many others which could be employed and yet come within the scope or ambit of my invention.

The whole is or may be enclosed in a casing J split into two sections and suitably connected or jointed on a plane which passes through the axis of the shafts B and G, and where the shafts G and R and spindles Y or Z emerge from the casing stuffing boxes $D^1$ are formed and suitable glands $E^1$ and packings $F^1$ are provided.

Any of the parts of the transmitter which are not specifically referred to are described in my prior application for patent No. 664,839.

I claim:

A hydraulic power transmitter comprising a fixed casing having a pair of outer turbine chambers with a connecting chamber to hold said outer chambers in spaced and axial alinement, a driving shaft rotatably mounted in said connecting chamber, an intermediate shaft supported within said chambers and connected to rotate with said driving shaft, a pair of oppositely disposed impellers mounted to rotate and to slide upon the intermediate shaft within the outer chambers, a ring carried by each of said impellers to slide therewith and to permit rotation of the impeller, a pair of pins supported within the intermediate chamber and having projecting ends outside of the chamber whereby to rotate the same independently, means for connecting said pins and rings to permit sliding movement of the impellers in opposite directions, a pair of driven shafts supported in said fixed casing in alinement with said intermediate shaft, and a disc provided with forward and reverse blades carried upon each of said driven shafts to permit the sliding movement of the impellers into registry with either the forward or the reverse blades whereby to control the rotation of the driven shafts.

DUNCAN CAMPBELL.